Jan. 17, 1950  J. B. STINE  2,494,638
MANUFACTURE OF AMERICAN TYPE CHEESE
Filed March 14, 1947
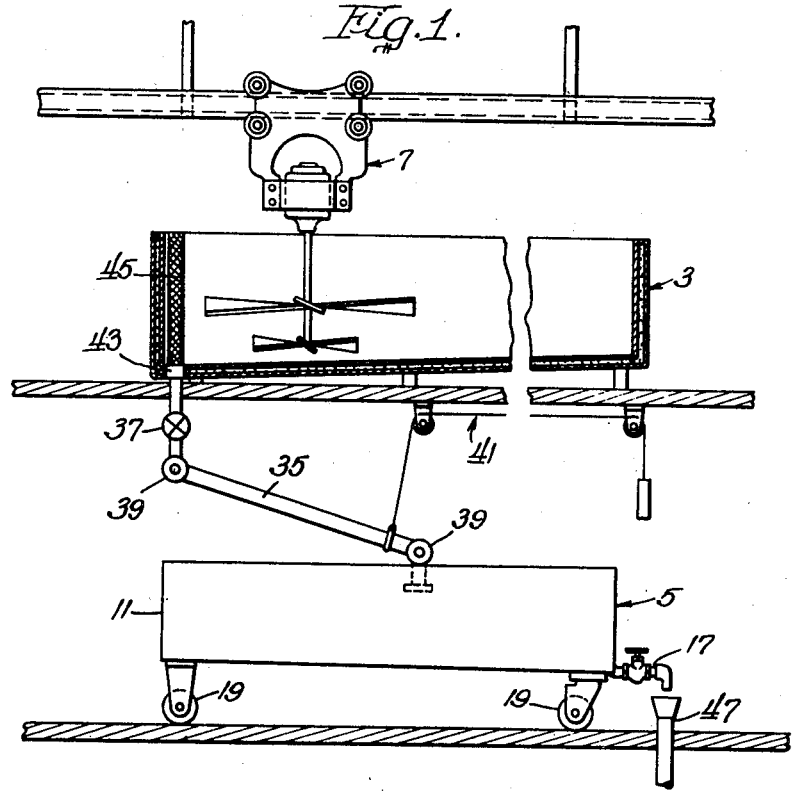
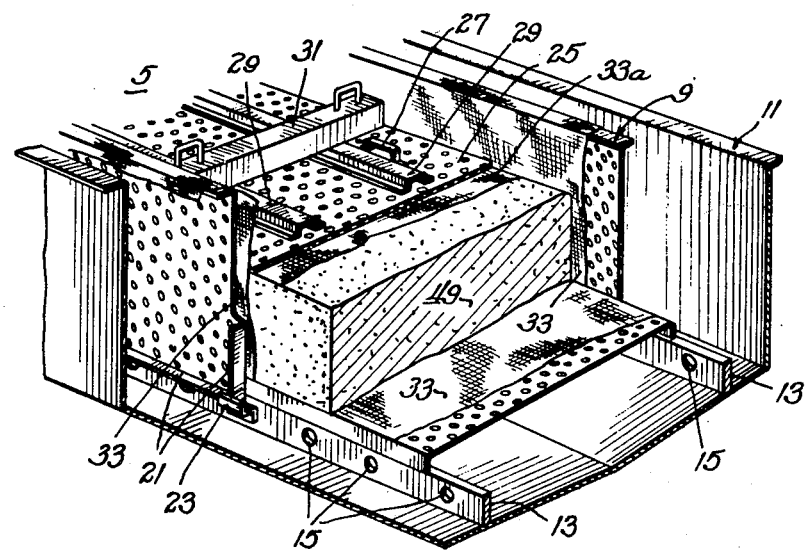
Inventor:
James Bryan Stine.
By Soans, Pond & Anderson
Attys.

Patented Jan. 17, 1950

2,494,638

UNITED STATES PATENT OFFICE 2,494,638

MANUFACTURE OF AMERICAN TYPE CHEESE

James Bryan Stine, Chicago, Ill., assignor to Kraft Foods Company, Chicago, Ill., a corporation of Delaware Application March 14, 1947, Serial No. 734,733

3 Claims. (Cl. 99—116)

The cheeses known as of the American type are understood to include all cheeses made by processes used to produce cheese of the American Cheddar, washed curd, or Colby types.

A typical Cheddar cheese process includes the following steps:

1. A batch of milk is inoculated with lactic starter and allowed to develop proper acidity.
2. The curd is set.
3. When the curd has reached the proper degree of firmness it is cut with suitable knives.
4. The curd is then agitated and the batch is heated to about 100 to 106° F. (this heating preferably should be accomplished in about 30 minutes).
5. After the cooking temperature has been reached, part of the supernatant whey is preferably withdrawn from the vat, and the cooking of the batch is continued until the curd feels firm and the whey shows an acid increase of preferably from about 0.2 to 0.3 per cent over the acidity at the time of cutting the curd.
6. The remainder of the whey is then drained off and the curd is raked out to the edge of the vat, where it is cheddared. This involves first allowing the curd to mat and then cutting, turning, and piling the matted curd along the sides of the vat, which operations are repeated at intervals over a prolonged period of time.
7. After the cheddaring is completed, the curd is cut up into chunks or strips, sprinkled with dry salt, and agitated sufficiently to thoroughly mix the salt with the curd.
8. The salted curd is then placed in hoop-shaped forms, and pressed overnight.
9. The pressed curd is then dried and wrapped or paraffined, after which it is kept in a curing room until ready for sale.

The various operations subsequent to cooking are time-consuming or laborious and, generally, result in an extremely high labor cost for these cheeses. Furthermore, the process steps which are carried out in the vat usually require about six hours, so that the vat can be used only for one or, at the most, two batches of milk per day.

I have discovered how to modify the typical Cheddar process in such a manner as to produce, with a minimum expenditure of time and labor, a cheese having a flavor equal to that of cheese made by the characteristic Cheddar process.

In carrying out the improved process I have made certain additions to, and changes in, the cheese making equipment, some of which are described in my co-pending application Serial No. 732,515, filed on March 5, 1947.

In my improved process, the laborious steps of cheddaring, milling, salting, and forming, are combined into steps which may be performed on a large scale so that the cost of labor and the time of the operation are reduced to a minimum. Moreover, I have found that the moisture content, which is an index of quality in Cheddar cheese, can be reduced materially below the usual moisture for these cheeses. The maximum allowable moisture for Cheddar cheese, as published by the United States Department of Agriculture, is 39 per cent. By my improved method, cheese may be consistently produced having a moisture content as low as 32 per cent.

General method

The operations involved in making American type cheese, according to my improved method, may be substantially the same as those for the conventional method as previously described, until after the usual cooking operation has been substantially completed. According to my preferred procedure, before all of the whey is removed about 2 per cent salt (NaCl), based upon the weight of curd, is added to the batch.

The temperature of the batch is then raised rapidly to about 10 to 12° F. above the temperature of the first cook. This elevated temperature promotes good knitting of the curd, and results in a cheese having an excellent texture. Immediately upon reaching the elevated temperature, the contents of the vat are rapidly sluiced into a filter mold. Press plates and weights, which give a loading of at least about 30 pounds per square foot, are applied to the surface of the curd in the mold, and the curd block is allowed to knit for several hours. After the curd block has become consolidated, it may be cut into smaller blocks of the desired size for finishing into merchantable cheese in accordance with any desired procedure.

The improved cheesemaking process effects large reductions in the labor involved in making American cheese, as compared with the conventional methods; the cheddaring, milling, and salting operations are eliminated so that the vat-time is reduced to about two hours. Also, the labor involved in the pressing operation is reduced to but a small fraction of that required for pressing in hoops.

The cheese that results from the process has the body, texture, and flavor of the finest Cheddar and American cheese. The moisture content of the cheese, as before stated, can be conveniently held considerably below the legal Cheddar standard of 39 per cent, and can be reduced to about 32 per cent, which is comparable to the finest imported cheeses.

Apparatus

Although special straining and pressing equipment might be incorporated in the vat, it is preferable to discharge the contents of the vat into a relatively smaller, specially designed filter mold arrangement equipped with the necessary straining facilities and, preferably, having a rectangular shape of a size such that the curd will form a bed covering the bottom of the mold about 8 inches in thickness. The area of the filter mold can, of course, be adjusted in accordance with the amount of milk used in a batch.

Although, in certain cases, it might be advisable to use a mold having a foraminous bottom and imperforate side walls, convenience and speed of operation are facilitated by making the side walls also foraminous so that the whey can escape quickly from the mold while the latter is being filled with curd and whey, and subsequently.

The apparatus which is described in the following paragraphs is more completely described in my aforesaid copending application, and all of the equipment may be used in the manufacture of either Swiss or American cheese.

In the drawings:

Fig. 1 is a diagrammatic view of apparatus adapted for use in making cheese by my improved method; and Fig. 2 is a fragmentary perspective view of the filter mold and tank illustrated in Fig. 1.

As illustrated, the apparatus includes a vat 3 of any convenient size and a filter mold 5. The vat 3 may be of any convenient shape, and I have used, with success, a rectangular steam-jacketed vat of the usual type used to set and cook curd for American or Cheddar type cheese. The vat 3 may be provided with suitable mechanical stirring equipment 7, as illustrated. The filter mold 5 includes a mold basket 9 and a tank 11. The mold basket 9 may be of any convenient size, but I have found a suitable size for use with a 10,000 pound batch of milk should have horizontal dimensions of about 32 by 100 inches. A mold basket 9 having these dimensions produces a block of curd which has a thickness of about 9 inches when a batch of 10,000 pounds of milk is being treated.

A pair of longitudinally extending supporting members 13 are disposed in the bottom of the tank 11. The upper surfaces of the supporting members 13 are level and form a stable and level base for the mold basket 9, so that the curd body disposed therein will be an even depth. Suitable drain holes 15 are provided in the longitudinal supporting members 13 so as to allow free drainage of whey from all portions of the tank 11. The tank 11 has a sloping bottom that drains to a valve 17 which is adapted to control the flow of whey out of the tank 11. The tank 11 is desirably supported upon wheels 19 to allow movement about the floor of the cheese factory.

The mold basket 9 has sides, ends, and a bottom, which are fabricated from a plurality of perforated plates. Each plate has flanged portions 21 which are adapted to be clamped to the adjacent plates. The sides of the mold basket 9 are vertically extending and are supported in clips 23 which are attached to the supporting members 13 in the tank. The ends of the mold basket are adapted to be clamped to the side plates and to the bottom plates of the mold basket. These ends may be clamped in any desired position within the mold, thereby allowing the dimensions of the mold to be adjusted to accommodate various sized batches of curd or to determine the depth of the curd bed deposited.

Cover or press plates 25 are provided for the mold basket 9, which comprise perforated, metal plates adapted to fit within the basket 9. The cover plates 25 have attached thereto, suitable handles 27 for placing them in position and for removing them after the curd block is formed.

Removable, longitudinally-extending channel sections 29 are provided to extend the entire length of the mold 9, and they are supported upon the cover plates 25. These channel members 29 support press weights 31 and serve to uniformly distribute the weight load across the entire upper surface of the curd block. The press weights may weigh 40 to 50 pounds. All of the materials used in the fabrication of the tank and the mold basket should desirably be stainless steel or some other material which may be easily cleaned and which will not have a deleterious effect on the cheese being made.

Before use, the interior of the mold basket 9 is lined with cheesecloth 33 by placing the cloth over the inner surfaces of the bottom, sides, and ends of the mold basket 9 before they are assembled. The cloth 33 is held in place by the clamping action effected by the sections when they are joined together.

The curd and whey may be transferred from the vat 3 in which they are cooked, to the filter mold 5 in any conventional manner. As illustrated in Fig. 1, the curd and whey may flow by gravity into the filter mold or they may be pumped by a centrifugal pump (of a type which will handle the curd).

In the illustrated structure, the vat 3 is provided with a drain pipe 35 equipped with a control valve 37 and universal fittings 39. The entire draining system may be counterbalanced by a suitable arrangement such as the counterweight and pulley 41 illustrated.

The connection between the drain pipe 35 and the vat 3 desirably includes a sump 43, which co-operates with a removable tubular screen member 45. The use of the screen member 45 allows the cheesemaker to draw off supernatant whey without losing curd. A whey disposal system 47 is located adjacent the position in which the filter 5 is disposed during the draining of the vat 3, and is adapted to receive the whey discharged from the valve 17 in the tank 11.

Specific example

The following is a description of my improved process, it being understood, however, that the details of the procedure followed may be varied to suit individual conditions and preferences. The milk analyzed about 3.5 per cent of milk fat. None of the fat was separated from the milk, but, before it entered the vat, it may have been pasteurized by a flash-plate pasteurizer, in the conventional manner.

The vat 3 used was a long, rectangular, steam-jacketed vat which was adapted to hold over about 10,000 pounds of milk, and was exactly the same as those used for the usual Cheddar or American cheese process. About 10,000 pounds of milk were introduced in the vat, and the filling took about 10 to 15 minutes. The milk was heated to about 86° F. and was inoculated with approximately one per cent lactic starter. The inoculated milk was allowed to ripen for about 30 to 45 minutes, whereupon it was set with 3 to 3½ ounces of rennet per 1,000 pounds of milk. As soon as the curd reached the proper degree of firmness it was cut with ¼ inch knives.

After cutting, the curd was not disturbed for at least 10 minutes, after which time slow agitation was applied for an additional 10 minutes before the batch was heated further. The batch was then heated at a slow, uniform rate to a temperature of about 102 to 104° F. allowing about 30 minutes for the required rise in temperature. About 10 minutes after this cooking temperature was reached, about ¼ to ⅓ the volume of whey was siphoned from the vat by using the tubular screen and the sump, as before described. The cooking operation was then continued until the curd felt firm and the whey showed an acid increase of from about .02 to .03 per cent over the percent of acid in the batch at the time the curd was cut. Up until this time, the batch was treated in about the same manner as any batch of American type cheese made in the conventional manner.

When the cooking was completed, enough of the whey was siphoned off to reduce the contents of the vat to about 3,000 to 4,000 pounds, thus retaining sufficient whey in the batch to maintain a fluid mixture. About 80 pounds of salt were then added to the batch and the whey and curd were then rapidly heated to about 110 to 112° F. (5 to 10 minutes) while stirring, and immediately the contents of the vat were sluiced, as rapidly as possible, into the mold basket 9 of the filter mold 5, which has been described in a preceding section. A layer of cheesecloth 33a was placed across the surface of the curd, indicated at 49 in Fig. 2, and the press plates 25 and weights 31 were applied over the cheesecloth 33a. The press plates 25 were weighted so that the total pressure applied to the curd block 49 was about 35 to 45 pounds per square foot. The weighting was varied in accordance with the slight changes in the composition of the curd which resulted from seasonal, or other, variations. The curd block was allowed to set overnight, and in the morning the original block of curd was divided into smaller blocks, which were dried and paraffined, or wrapped, or both, and were then sent to storage for curing in the conventional manner.

The features of my invention that are believed to be new are set forth in the appended claims.

I claim:

1. The process of manufacturing cheese having the characteristics of American type cheese which comprises setting and cutting the curd; then cooking the cut curd; then draining off a portion of the whey, sufficient whey being retained to maintain a fluid mixture; then adding salt to the resulting fluid mixture of the curd and remaining whey; then raising the temperature of the salted mixture; then immediately separating the curd from the remaining whey; then applying pressure to the curd to form a block of curd; and finally curing the block of curd.

2. The process of manufacturing cheese having the characteristics of American type cheese which comprises setting and cutting the curd; then cooking the cut curd at a temperature from about 100 to 106° F.; then draining off a portion of the whey, sufficient whey being retained to maintain a fluid mixture; then adding salt to the resulting fluid mixture of the curd and the remaining whey, then raising the temperature of the salted mixture to a temperature of about 10 to 12 degrees F. higher than the temperature of said cook; then immediately filtering the whey from the curd; then applying pressure to the curd to form a block of curd; and finally curing the block of curd.

3. The process for manufacturing cheese having the characteristics of American type cheese which comprises setting and cutting the curd; then cooking the cut curd at a temperature from about 102–104° F.; then draining off a portion of the whey, sufficient whey being retained to maintain a fluid mixture; then adding salt to the resulting fluid mixture of the curd and the remaining whey; then rapidly raising the temperature of the salted mixture to about 110–112° F. during a period of from 5 to 10 minutes; then immediately filtering the whey from the curd; then applying pressure of at least about 30 pounds per square foot to the curd in order to form it into a block; then allowing the curd to knit; and finally curing the knitted block of curd.

JAMES BRYAN STINE.

REFERENCES CITED

The following references are of record in the file of this patent:

United States Dept. of Agriculture, Bulletin No. 608, March 6, 1918, published Government Printing Office, Washington, D. C., 1918. "Varieties of Cheese: Description and Analyses," by C. F. Doane et al., pages 12, 13, 27, 29, 34 and 37.

Certificate of Correction

Patent No. 2,494,638 January 17, 1950

JAMES BRYAN STINE

It is hereby certified that error appears in the printed specification of the above numbered patent requiring correction as follows:

Column 1, line 21, for "0.2 to 0.3 per cent" read *.02 to .03 per cent*; and that the said Letters Patent should be read with this correction therein that the same may conform to the record of the case in the Patent Office.

Signed and sealed this 9th day of May, A. D. 1950.

[SEAL]

THOMAS F. MURPHY,
*Assistant Commissioner of Patents.*